Figures 6, 7:
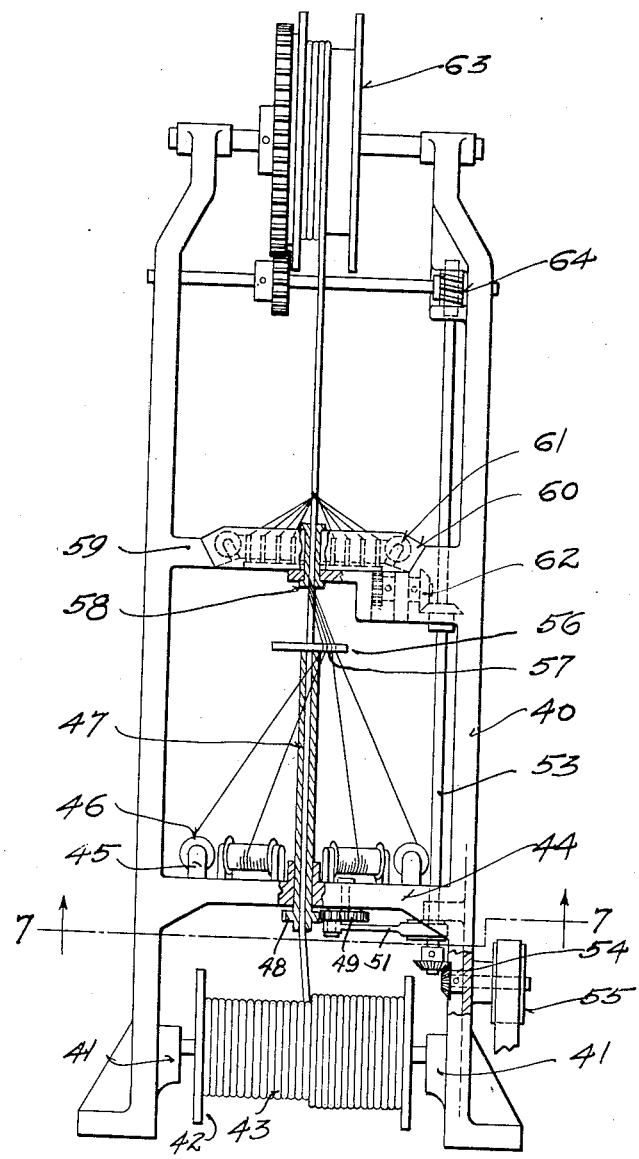

Oct. 14, 1941.　　　T. F. PETERSON　　　2,258,687
CONCENTRIC CABLE
Filed Aug. 31, 1937　　　2 Sheets-Sheet 1
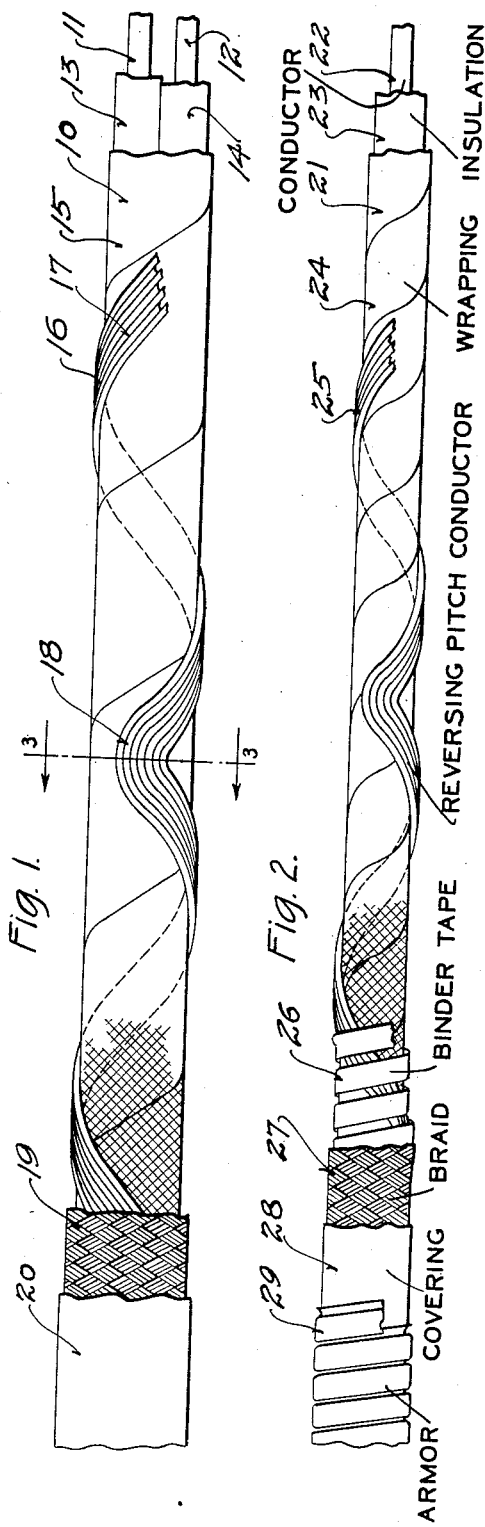
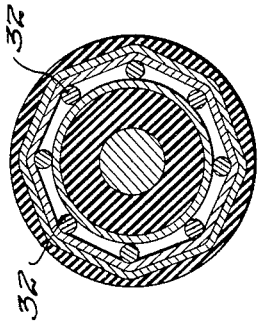
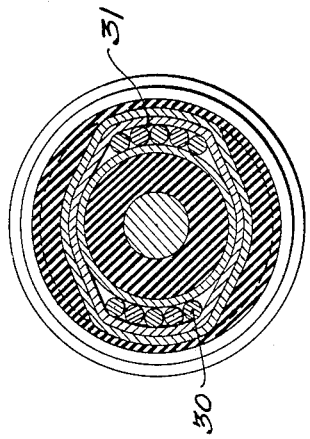
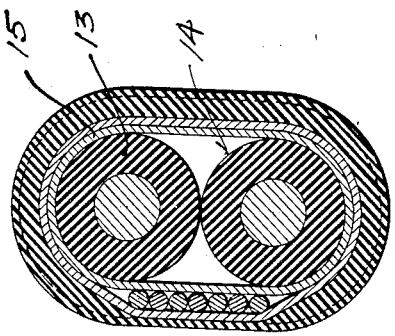
INVENTOR.
Thomas F. Peterson
BY
ATTORNEY.

Oct. 14, 1941.          T. F. PETERSON          2,258,687
                         CONCENTRIC CABLE
                       Filed Aug. 31, 1937          2 Sheets-Sheet 2

INVENTOR.
Thomas F. Peterson
BY
ATTORNEY.

Patented Oct. 14, 1941

2,258,687

UNITED STATES PATENT OFFICE 2,258,687

CONCENTRIC CABLE

Thomas F. Peterson, Worcester, Mass.

Application August 31, 1937, Serial No. 161,814

4 Claims. (Cl. 174—115)

This invention relates to insulated cables of the type known as concentric cables in which a conductor is concentrically arranged with relation to a central conductor. In the manufacture of cables of this type it is common practice to lay a number of bare wires helically around the insulated central conductor or core and thereby form the concentric conductor; usually a sufficient number of wires are used to substantially cover the core, and the concentric conductor can be insulated or merely protected mechanically by a fibrous or other covering. Numerous advantages follow from a cable construction of this character among them being a reduction in diameter, reduction in weight, symmetry, low cost, automatic shielding and the like. There are, however, disadvantages as well which follow primarily from the difficulties in splicing and the necessity for cutting the concentric conductor in order to reach the inner conductor.

The present invention provides a cable of the concentric type which retains the advantages associated with such cables but has in addition among others the characteristic of being simple to splice or make connections. Briefly this is accomplished by forming the concentric conductor with reversed helical lays along the length of the cable. The reversals in lays can vary from each half turn up to several complete turns in one direction before reversing the lay in the opposite direction. By laying the wires forming the concentric conductor in this manner it is a comparatively simple matter to expose the insulated core at any desired point by pulling on the wires. Preferably the wires constituting the concentric conductor are held in place by a binder or covering; and by suitably lubricating the surfaces of the inner and outer layers adjoining the concentric serving the pulling of the wires toward a point at which the outer covering is opened is facilitated so as to give access to the insulated core. The cable with the reverse lay concentric conductor is inexpensive to manufacture and can be produced at fairly high speed.

The invention as illustrated in the accompanying drawings in which Fig. 1 is a longitudinal view of a three conductor cable embodying the invention and illustrating in part one type of covering; Fig. 2 is a longitudinal view of a two conductor cable and illustrating in part a different form of covering from that of Fig. 1; Fig. 3 is a cross-section on the line 3—3 of Fig. 1; Fig. 4 shows in enlarged cross-section a modification of Fig. 2 in which the concentric conductor wires are laid in two separate groups; Fig. 5 illustrates a further modification in which the wires forming the concentric conductor are individually spaced; Fig. 6 illustrates a machine for producing the reverse lay; and Fig. 7 is a cross section on line 7—7 of Fig. 6.

Referring to Figs. 1 and 3, the embodiment therein illustrated consists of a core 10 formed by central conductors 11 and 12 with their individual insulations 13 and 14 and having wrapped about them a covering 15 which can be a roving, braid or tape, a coating of compound, or the like; the covering 15 is preferably waxed. About the covering is helically laid the concentric conductor 16 composed of individual wires or strands 17. At intervals the helical pitch of the wires is reversed in direction lateral to the core axis along the length of the cable as at 18; the angle traversed in one direction ranges from a partial turn to several complete turns about the core axis. For the sake of clearness only a few wires are illustrated; actually, enough wires can be used to give a coverage of from 50-100% about the coating 15 in order to permit the use of fine wires and thus reduce the outside diameter of the cable. Over the wires there can be placed any suitable form of binder or covering such as the braid 19 or equivalent roving or tape having a uni-directional pitch and shorter than that of the conductor 16; and this can be waxed or otherwise lubricated, as for example on the surface contacting the wires. The braid 19 can in turn be protected by a saturant or covering 20 of other suitable material such as rubber, asbestos, coating of compound, armor or the like, or various combinations of these.

In the form illustrated in Fig. 2 the core 21 consists of a single conductor 22 (usually a number of fine wires) with its insulation 23 and wrapping 24. About the wrapping is helically laid the concentric conductor 25 as in the embodiment of Fig. 1. In this figure the concentric conductor is illustrated as being held in place by a helically-wound waxed tape 26 over which is placed the braid 27, rubber or asbestos covering 28 and the protecting armor 29.

As shown in the embodiments of Figs. 1 and 2, the wires forming the concentric conductor are formed in a single group. They can, however, be spread into two or more distinctive groups as 30 and 31, illustrated in Fig. 4; in this form by insulating the groups from each other a plurality of concentric conductors is possible. Or the wires can be individually spaced about the core as illustrated by the wires 32 in Fig. 5.

In practice the wires forming the concentric conductor are advanced helically in one direction for a distance of one-half turn to several turns around the core. The concentric conductor is then reversed for about the same or a different distance, and the reversal repeated along the length of the cable.

The reverse helical lay can be made by machine. Such a machine is illustrated in Fig. 6, in which a frame 40 supports the various parts. At the lower end of the frame bearings 41 are provided to support a reel 42 carrying the core 43, to which the reverse lay concentric conductor is to be applied. As a part of the frame 40 there is a transverse connecting member 44 carrying supports 45 for spools of wire 46 for forming the concentric conductor. Extending through and journaled in the member is an elongated hollow spindle 47 through which the core is fed; the lower end of the spindle carries a pinion 48 which is engaged by a gear 49 and mounted on a stub shaft 50 secured to the transverse member. A crank arm 51 is connected at one end to the gear and at the other end to an eccentric 52 mounted on a shaft 53 extending vertically of the frame. The shaft 53 is driven through the bench gears 54 and drive wheel 55.

The spindle 47 at its upper end carries a head 56 which turns with the spindle. Through the head there are guide openings 57 for the wires 46. The direction of rotation of the head is periodically reversed through the oscillation of the gear 49 by the crank 51. The extent of rotation of the head in one direction is controlled by the ratio of the gears 48 and 49, and can be varied from a partial turn to several complete turns in one direction by substituting gears 48 and 49 of the required ratio.

The wires 46 pass from the oscillating head 56 around the core 43 passing through the spindle 47. As they are wound about the core through the rotation of the head 56, they together with the core are engaged by a nose piece 58 supported by a second transverse member 59 of the frame. The nose piece prevents separation of the wires from the core upon reversal of rotation of the head 56.

Rotatably mounted on the member 59 is a cradle 60 carrying spools 61 of thread, tape, braid or other covering material. The cradle is rotated through gearing 62 from the shaft 53. The covering material is wound about the core and the applied wires from the nose piece. Any of the known mechanisms for braiding or otherwise applying a covering or binding material can be substituted for that illustrated.

A draw-off drum 63 is journaled in the top of the frame. The drum is turned at the proper speed through gearing 64 from the shaft 53 to draw the core and the applied wires and covering through the machine.

From the description given the operation of the machine its operation is obvious. As the core 43 is drawn through the machine the wires are laid on helically through the rotation of the head 56 and the extent to which the wires are laid in one direction depends upon the ratio of the gears 48, 59. The covering material applied over the wires serves to hold the reverse lay wires in place.

What is claimed is:

1. Electric cable comprising a conductive core, a plurality of generally parallel strands of electrically conducting elements helically disposed about the core in a layer concentric with the core and insulated therefrom and with the direction reversed periodically along the length of the core, and means for maintaining the strands about the core, said means including a wrapping having a uni-directional pitch about the core and a shorter pitch than the helical strands.

2. In an electric cable including a conductive core an electrically conducting element helically disposed about the core and insulated therefrom, the pitch of the helical element having its direction reversed periodically along the length of the core at intervals with the angle traversed in each direction ranging from a partial turn to several complete turns, and means for maintaining the element about the core, said means including a wrapping having a uni-directional helical pitch about the core and a shorter pitch than the helical strands.

3. Multiple conductor cable comprising in combination a central core including a conductor and insulation enclosing the conductor, a second conductor composed of strands concentric to the core and helically laid thereabout with its pitch reversed in direction lateral to the core axis periodically along the length of the cable at intervals with the angle traversed in each direction ranging from a partial turn to several complete turns, means for binding the strands to the core including an element having a uni-directional helical lay about the core and a shorter pitch than the strands of the second conductor, and a protective covering over the binding means.

4. Multiple conductor cable comprising in combination a central core including a conductor and insulation enclosing the conductor, a second conductor composed of strands concentric to the core and helically laid thereabout with its pitch reversed in direction lateral to the core axis periodically along the length of the cable at intervals with the angle traversed in each direction ranging from a partial turn to several complete turns, said cable having means for binding the strands to the core including an element having a uni-directional helical lay about the core and a shorter pitch than the strands of the second conductor.

THOMAS F. PETERSON.